UNITED STATES PATENT OFFICE.

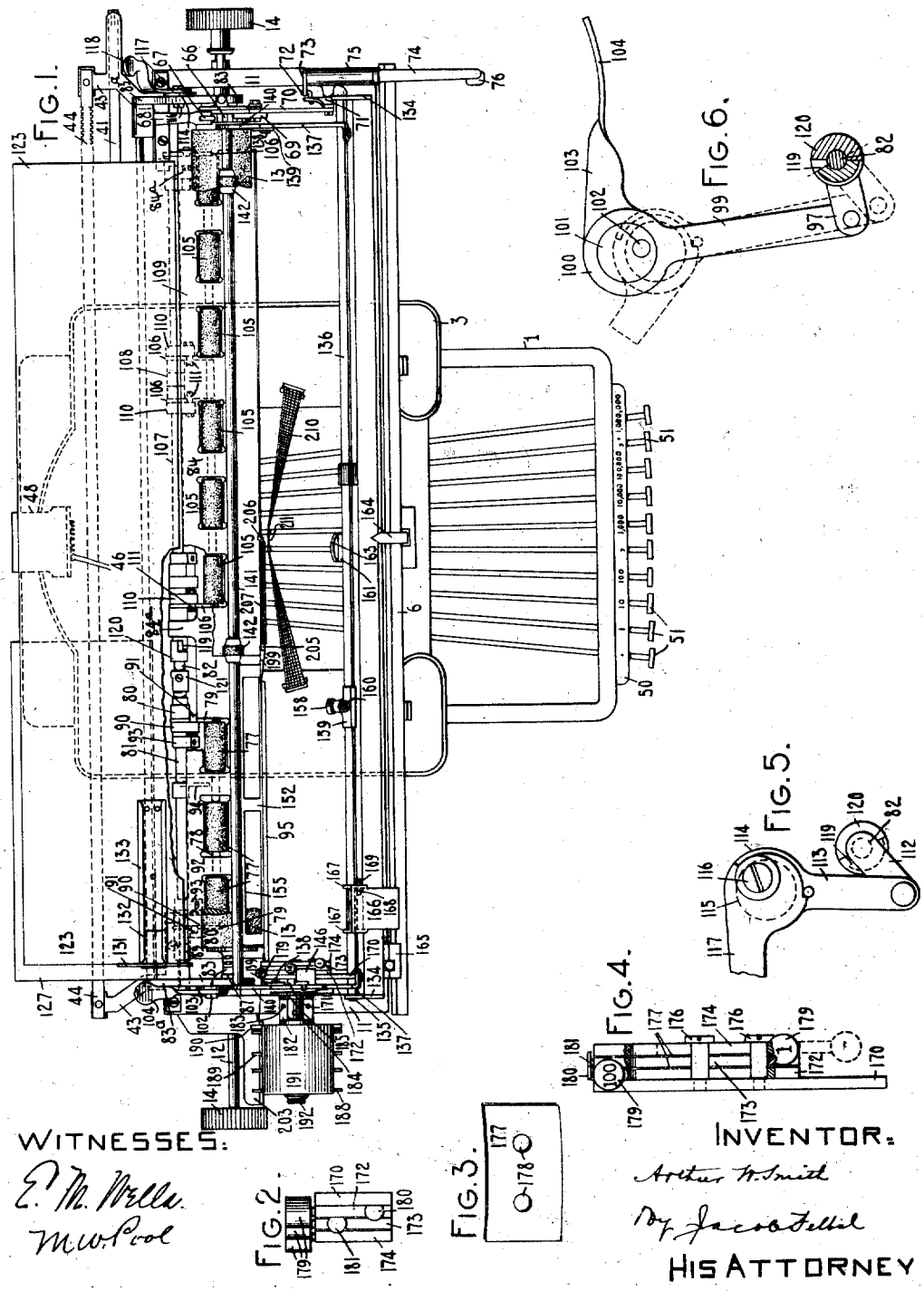

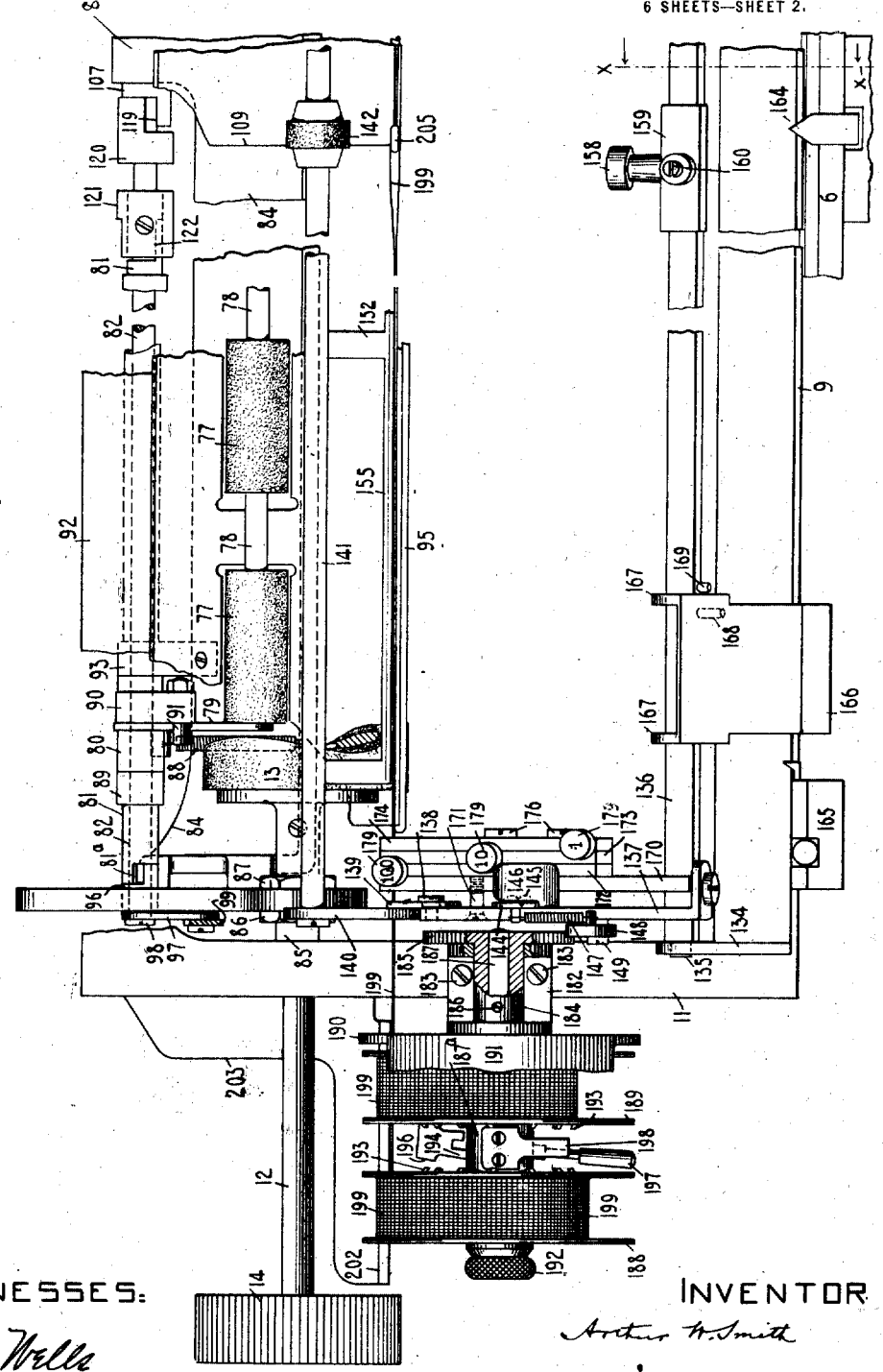

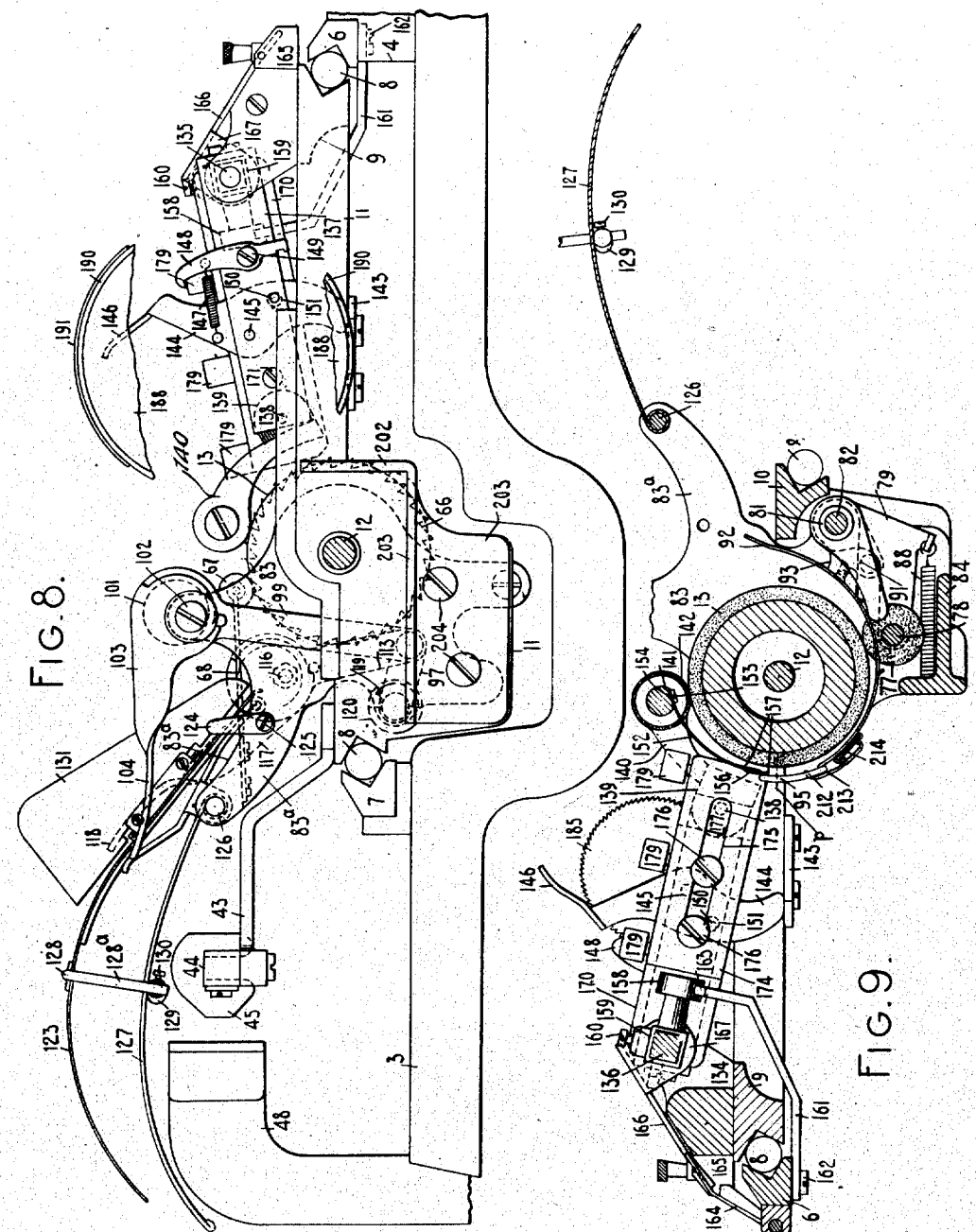

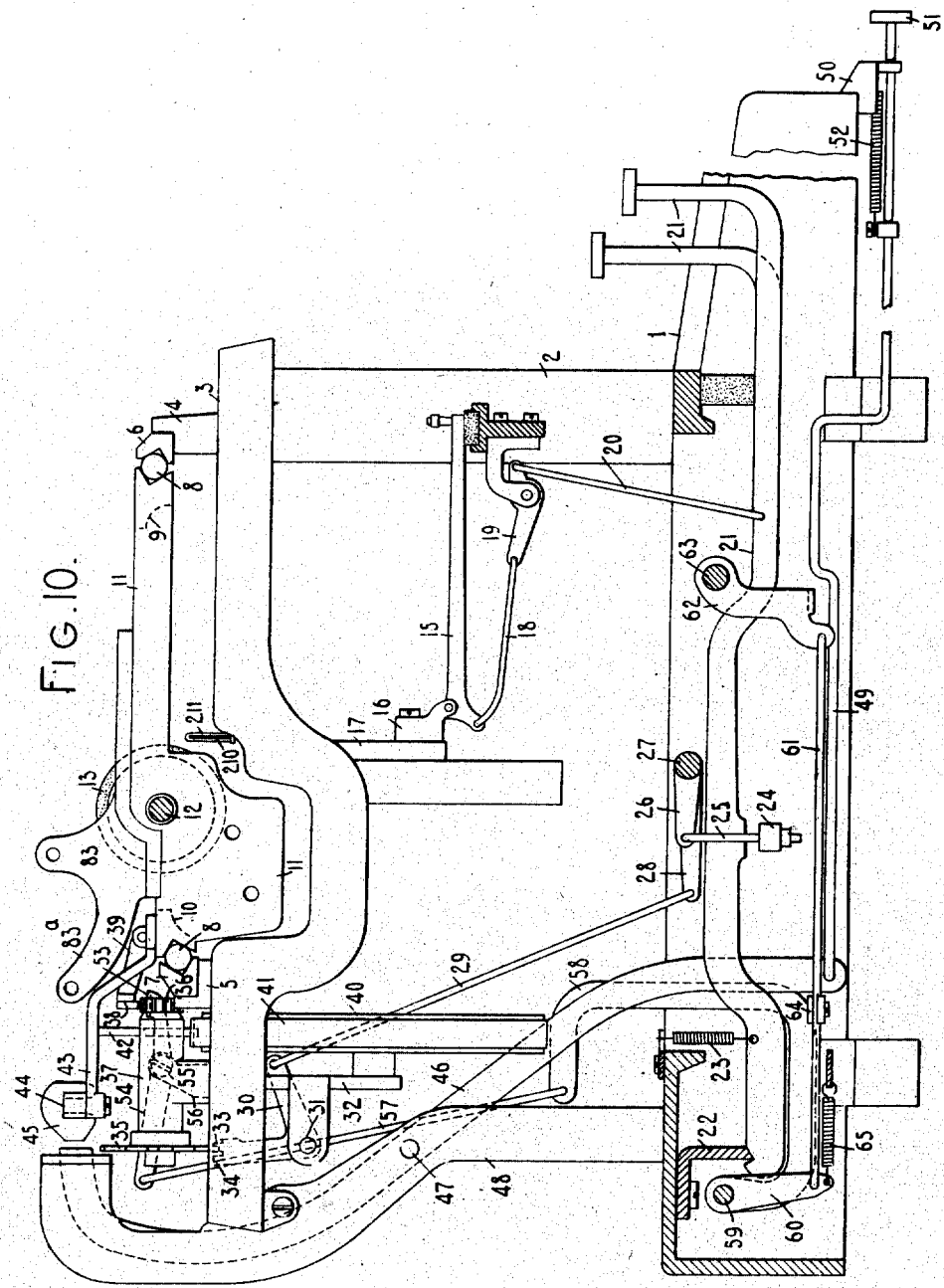

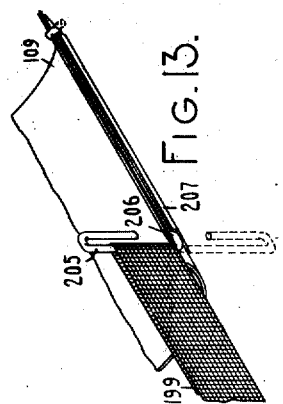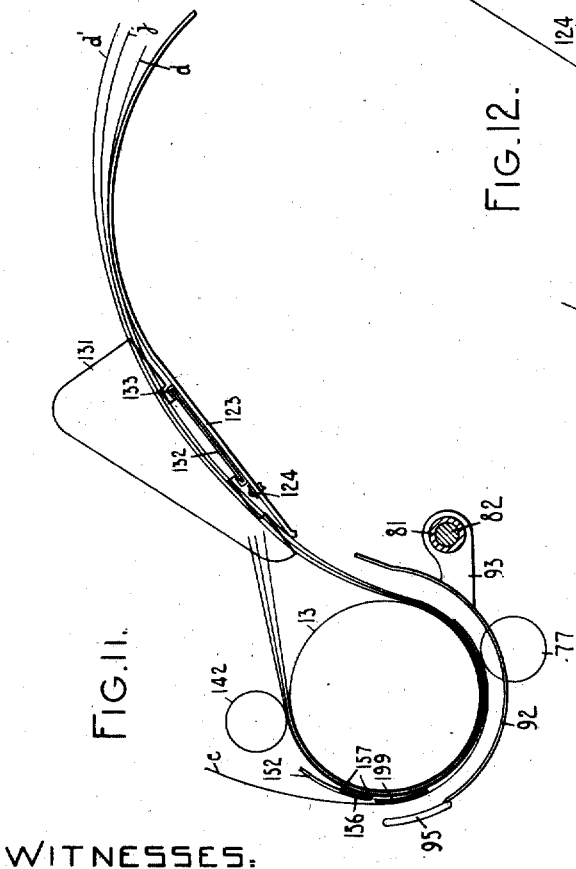

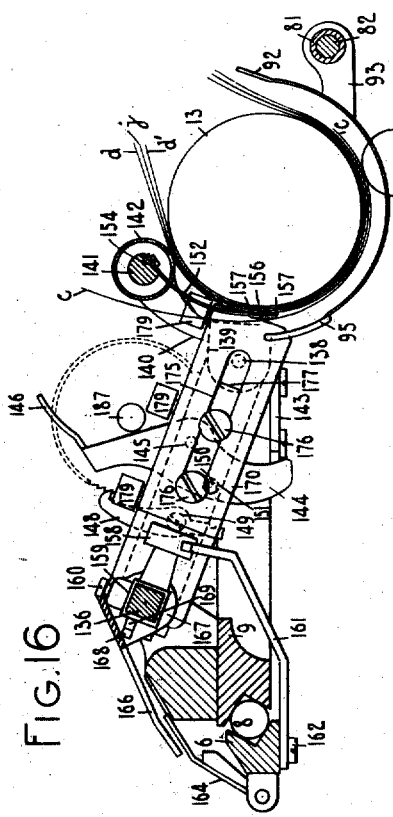

ARTHUR W. SMITH, OF NEW YORK, N. Y., ASSIGNOR TO REMINGTON TYPEWRITER COMPANY, OF ILION, NEW YORK, A CORPORATION OF NEW YORK.

TYPE-WRITING MACHINE.

1,209,218.  Specification of Letters Patent.  Patented Dec. 19, 1916.

Application filed April 8, 1915. Serial No. 19,871.

*To all whom it may concern:*

Be it known that I, ARTHUR W. SMITH, citizen of the United States, and resident of the borough of Manhattan, city of New York, in the county of New York and State of New York, have invented certain new and useful Improvements in Type-Writing Machines, of which the following is a specification.

My present invention relates to improved means for writing and recording checks or the like and the principal object of said invention is to equip a typewriting machine with special mechanism embodying means of the character specified. In the present instance in carrying out this principal object, further objects are attained as follows: The provision of, first, differential or denominational side gage mechanism; second, indicating devices of novel character; third, new and improved manifold cut-out devices; fourth, new and improved carriage carried ribbon mechanism; fifth, paper feeding and controlling mechanism of novel construction; and, sixth, novel carriage stop mechanism.

Other secondary objects will hereinafter appear.

To the above ends my invention consists in the features of construction, combinations of devices and arrangements of parts hereinafter described and particularly pointed out in the claims.

The preferred form of the invention has been applied to a No. 11 Remington frontstrike typewriting machine and is illustrated in the accompanying drawings, wherein—

Figure 1 is a top plan view of said Remington machine embodying my invention. Figs. 2, 3 and 4 are detail views of the denominational side gage mechanism. Figs. 5 and 6 are detail views of parts of the paper feeding and controlling mechanism. Fig. 7 is an enlarged fragmentary plan view showing the left-hand end portion of the carriage and parts mounted thereon. Fig. 8 is a fragmentary end view showing the upper part of the machine on the same scale as Fig. 7, some parts being broken away and in section. Fig. 9 is a transverse sectional view taken on a plane indicated by the dotted line *x—x* in Fig. 7 and looking in the direction of the arrows. Fig. 10 is an end elevation partly in section of the machine with parts omitted. Figs. 11 and 12 are end views showing diagramatically the course of the paper when fed through the machine. Figs. 13 and 14 are detail views of parts of the ribbon guiding and controlling devices. Fig. 13 being a perspective view and Fig. 14 a fragmentary rear elevation of the carriage carried ribbon spools and adjacent guides. Fig. 15 is a fragmentary front elevation showing the indicating and associated devices. Fig. 16 is a view corresponding to Fig. 9 but showing some of the parts in different relations and omitting other parts. Fig. 17 is a face view of a check or form to the filling in whereof my invention is particularly adapted. Fig. 18 is a fragmentary face view of a record sheet.

Referring first to Figs. 1, 7, 8 and 10, the main frame of the machine is shown as comprising a base 1, posts 2 and a top plate 3 from which rise fixed standards 4 and 5 whereto are attached front and rear grooved guide rails 6 and 7 which respectively coöperate through antifriction balls 8 with the front bar 9 and rear bar 10 of a rectangular carriage frame or truck which further comprises connecting end bars 11. Journaled in the end bars is the axle 12 of a long rotary non-shiftable platen 13, said axle being provided at its ends with finger wheels 14. Coöperative with the front face of the platen is a circularly arranged series of type bars 15 pivoted in hangers 16 secured against the front face of a segment 17. Each type bar is preferably provided with a single needle pointed type and is connected by a link 18, a lever 19 and a second link 20 with a key lever 21, the set of key levers being fulcrumed on a bar 22 at the rear of the base and each key lever being provided with a restoring spring 23. A universal bar 24 underlies the key levers and is supported by arms 25 depending from crank arms 26 fixed to a rock shaft 27 that is provided with a central, rearwardly extending crank arm 28 connected by a link 29 with a dog rocker 30 pivoted at 31 on a stationary bracket 32. Dogs 33 and 34 mounted on said dog rocker coöperate with a toothed escapement wheel 35 that is operatively connected with a feed pinion 36 fixed to a shaft (not shown) but which bears in a stationary bracket 37. Normally meshing with the pinion 36 is a spring-pressed feed rack 38 carried by arms 39 pivoted on the rear bar 10 of the carriage. The escapement devices control through the printing key levers the step-by-step leftward movement of the carriage under the impulse of a spring drum or motor 40 which is connected by a strap 41 with an arm 42 depending from the right-hand one of a pair of brackets 43 screwed to the rear bar 10 at its ends.

The brackets 43 provide a support for a toothed column stop bar 44 that is comprised in the usual tabulating mechanism of the machine. Mounted adjustably on the stop bar 44 are column stops 45 with which coöperate denominational stop levers 46 pivoted at 47 in a bracket or support 48 attached to the main frame at its rear. The lower ends of the levers 46 are pivotally connected to push rods 49 that bear in a guide bar 50 fixed to the front of the base. Said rods 49 are provided with tabulator keys 51 and with restoring springs 52. Each key 51 when operated projects its associate stop lever 46 into the path of the column stops and concurrently effects the release of the carriage by separating the feed rack 38 from the pinion 36. The carriage releasing devices comprise a lifting shoe 53 underlying the rack 38, said shoe being mounted on the front arm of a lever 54 pivoted at 55 on a stationary bracket 56. The rear arm of the lever 54 is connected by a link 57 with an angular arm 58 fixed to a rock shaft 59 mounted in the rear portion of the base and provided with a pair of depending crank arms 60 connected by rods 61 with a bail 62 pivoted on a stationary rod 63. The rods 61 support a cross bar or strap 64 which is fastened to the rods 61 in the rear of the ends of the levers 46 so that the lever ends actuate the bar and through the described train of connections swing upward the shoe 53 to disconnect the rack 38 from the feed pinion 36. Restoring springs 65 restore the releasing devices to normal position after operation.

The platen 13 is equipped with line spacing mechanism of ordinary Remington construction comprising a ratchet wheel 66 operatively connected with the right-hand end of the platen. With said ratchet wheel engages a roller detent 67 mounted on a spring arm 68. The ratchet wheel is actuated by a pawl 69 operative by devices comprising a link 70 connecting the pawl with a bell crank 71 pivoted on the carriage and connected by a link 72 with a crank arm 73 on a rock shaft 74 mounted to turn in a housing 75 on the right-hand end bar 11, the rock shaft terminating at its front end in a downwardly extending line spacing finger piece or handle 76 which is operative both to turn the platen and restore the carriage from left to right.

The platen is equipped with paper feeding mechanism which in some respects resembles that disclosed in the patent to Phelps No. 1,100,442, granted June 16, 1914 and found in some specially equipped Remington typewriting machines; but the present mechanism has novel features not found in the prior construction. Two sets of paper feed rollers are provided and two release keys arranged at opposite ends of the platen. The smaller feed roller or set of rollers coöperates with the left-hand end portion of the platen and is releasable by the left-hand key independently of the right-hand roller or set of rollers which is twice as long as the left-hand set and coöperates with the right-hand end portion of the platen. The right-hand release key effects the release of all of the feed rollers simultaneously.

Referring to Figs. 1 and 5 to 9, inclusive, the left-hand feed roller is shown as composed of sections 77 mounted on a rod or shaft 78 which is supported on brackets or arms 79 provided with collars 80 which bear loosely on a sleeve 81 mounted to turn on a rock shaft 82. Said rock shaft extends from end to end of the platen and is supported on parallel end bars 83 arranged inside the end bars 11 and connected under the platen by a cross bar 84. The bars 83 and cross bar 84 constitute a frame, which frame is rigid with the main part of the carriage frame, the connection between the two frames comprising sleeves 85 which have a tight fit at their outer ends in the end bars 11 and are screwed into the bars 83, each being set by a locking nut 86 which coöperates with the outer face of the bar 83, the inner face of said bar being clamped by the head or flange 87 of the sleeve 85. The left-hand feed roller 77 is urged toward the platen by draw springs 88 connected to the brackets 79. To prevent outward movement of said brackets along the sleeve 81, collars 89 are set fast on said sleeve, while inward movement of said brackets is prevented by short crank arms 90 set fast on said sleeve and provided with lateral pins 91 which overlie the brackets 79. A paper apron 92 cut out to provide openings for the feed roller sections is mounted on blocks 93 which bear loosely on the sleeve 81. Said apron is maintained in normal position by an arm 94 fast on the sleeve 81 at about the middle of the apron 92. The forward end portion of the apron 92 is provided with a skeleton extension which is preferably in the form of a rectangular wire frame 95 with rounded corners as best shown in Fig. 15. This frame extends the length of the apron 92 and its lower side is fixed to the upper edge portion of the apron by soldering or in any other suitable way so that the wire extension is rigid with the apron.

When the apron is moved away from the platen during the releasing operation as hereinafter described, the wire extension 95 coöperates with the platen to provide a wide opening or throat through which the short bill sheet or check may be readily introduced from the front, being guided over the extension 95. In other words, the extension 95 facilitates the front feeding of a work sheet that is introduced over the left-hand end portion of the platen. The sleeve 81 is cut at its left-hand end as indicated at 81ª to provide a shoulder which coöperates with an oppositely shouldered sleeve or hub 96 bearing on the shaft 82 and rigid with a crank arm 97 which is held against displacement by a headed screw 98 that is threaded into the end of the shaft 82. The crank arm 97 is pivotally connected with the lower end of an arm 99 which at its upper end is formed into an eccentric strap 100 which receives an eccentric 101 pivoted at 102 on the left-hand end bar 83 and rigid with a releasing arm 103 which terminates in a release key or finger piece 104. Normally this key 104 is in its rearmost position shown in Fig. 8, but when it is swung forward, it causes the shouldered collar 96 to engage behind the shaft 82 with the shouldered end of the sleeve 81, thereby picking up said sleeve and causing its upper portion to rotate forward with the result that the crank arms 90 rigid on said sleeve are turned, causing the pins 91 to act against the bracket 79, overcoming the springs 88 and swinging the feed roller 77 away from the platen. At the same time the arm 94 swings downward, releasing the apron 92. The feed roller is restored to normal position by the springs 88 when the key 104 is returned. The right-hand feed roller comprises sections 105 which are divided into two groups of three each, each group being mounted on a pair of spring-pressed brackets or arms 106 which bear loosely on a sleeve 107 mounted on the right-hand end portion of the shaft 82. The hub portions of the inner brackets 106 are separated by a collar 108 on said sleeve and the outermost or right-hand bracket is controlled by a collar, and the hub portion of the innermost or left-hand bracket 106 abuts against an upright bearing portion 84ª integral with the cross bar 84. There are two of these bearing portions and the sleeve 81 passes loosely through them, these bearing portions preventing bowing of the sleeve 107 and the shaft 82. A long releasable paper apron 109 like the apron 92 coöperates with the right-hand end portion of the platen and its apertured forward feed roller 105. Release arms 110 rigid on the sleeve 107 are provided with pins 111 overlying the brackets 106 to turn the sleeve 107. To cause the pins 111 to release the feed roller 105, devices are provided comprising a crank arm 112 which has a lost motion connection with the right-hand end of the sleeve 107 similar to the connection between the sleeve 81 and its crank arm 97. The crank arm 112 is pivotally connected with an arm 113 which is provided at its upper end with an eccentric strap 114 that receives an eccentric 115 pivoted at 116 on the right-hand bar 83. Rigid with the eccentric 115 is an arm 117 which terminates in a finger piece or right-hand release key 118. By pulling forward said release key 118 from its rear position the sleeve 107 is turned to release the feed rolls 105. At its left-hand end the sleeve 107 is shouldered as indicated at 119 to coöperate with a shouldered collar 120 fast on the shaft 82 so that when the sleeve 107 is turned by the key devices hereinafter described, it will transmit movement to the shaft through the collar 120. The shaft in turn will transmit such movement through a shouldered collar 121 to the sleeve 81 which is shouldered at its right-hand end as indicated at 122 opposite to the collar 121. Thus the sleeve 107 is effective when actuated by its key 118 to release the feed roller 105 and also to turn the sleeve 81 to release the feed roller 77. On the other hand, the release of the feed roller 77 will not affect the feed roller 105. This will be best understood from a consideration of Fig. 7 from which it will be apparent that the shoulder 122 on the sleeve 81 will turn from the normal to the operative position without picking up or affecting the collar 121, although when this collar moves under actuation of the key 118 it will pick up the sleeve 81. It will be observed that I provide a feed roller mechanism or set of paper controlling devices coöperative with one end portion of the platen and releasable by a key at one end of the platen, in the present instance the same end as that at which the paper controlling devices are arranged; that another set of paper controlling devices is provided to coöperate with the opposite end portion of the platen and releasable by a second key at the opposite end of the platen from the first key, said second key, in the present instance the key 118, being effective to simultaneously release both feed rollers or sets of paper controlling devices.

A paper table 123 of ordinary construction extends the full length of the platen at the rear side thereof and has laterally projecting angular lugs 124 which are hinged at 125 to rearwardly extending portions 83ª of the end bars 83. The portions 83ª are connected at their rear ends by a cross rod 126 and to the left-hand end portion of this cross rod is hinged a supplementary paper table 127 which underlies the main paper table 123 and extends a comparatively short distance toward the right end as best shown in Fig. 1. The two paper tables are connected by an angular arm 128 which is screwed or otherwise secured to the left-hand end portion of the paper table 123 and extends downward past the end of the paper table 127. Slidably mounted on this round extended portion is a finger 129 which is adjustably set in position by a set screw 130. This finger underlies the paper table 127 and provides a support for said table, holding it up so that it cannot strike against the side of the tabulator bracket or frame 48. Also the finger so connects the two paper tables that when the main table 123 is lifted or swung forward the table 127 will also be swung forward. In Fig. 9 the finger 129 is shown turned slightly forward so that its construction can be seen. Adjustably mounted on the table 123 at its left-hand side is a side edge gage 131. This gage is in a vertical plane and is provided with an angular extension or tongue 132 which slidably engages in a grooved track 133 riveted to the upper face of the table 123. The construction is such that the gage or guide 131 is frictionally held in adjusted position lengthwise of the platen.

The manifold cut-out and denominational or differential side gage mechanisms are supported on a paper controlling or pressure bail or carrier different in some respects from that heretofore in use and which will be described in connection with Figs. 1 and 7 to 9. Perforated ears 134 rigidly mounted at opposite ends of the front bar of the carriage provide bearings for the pintles or round end portions 135 of a square rod or rock shaft 136. Fixed to said rod near its ends and projecting rearward are arms 137 to the end portions of which are pivoted at 138 ears 139 rigid with supplementary arms 140 which curve upward and rearward and are connected at their free ends by a round rod or bar 141. Adjustably mounted on the rod 141 are rubber covered pressure rolls 142 of ordinary construction, these rolls coöperating with the front upper portion of the platen to hold the paper after it has passed the printing point. In the present construction two of these rolls are shown and they are intended for coöperation with the right-hand portion of the wide record sheet which extends substantially through the full length of the platen. The short work sheet or check is controlled independently of said rolls. The arms 140 are loosely mounted on the arms 137 and have a pivotal movement thereon which is limited in both directions by the engagement of the front face of the arms 140 with the back end or edge of the arms 137. This will be best understood from Figs. 7 and 8 from the first of which it will be seen that the arms are in the same plane, the connecting ear 139 being at one side of this plane; while Fig. 8 shows the rounded face of the arm 140 engaged with the lower part of the end of the arm 137. In the Fig. 8 position which corresponds with Fig. 9, the downward movement of the main frame of the pressure bail comprising the shaft 136 and arms 137, as well as that of the supplementary frame comprising the rod 141 and arms 140 pivoted on said main frame, is limited by stop or detent devices comprising a horizontal ledge or stop 143 screwed or pivoted to the under face of the left-hand end bar 11 and projecting inward therefrom. Said ledge provides a support for a relatively movable latch or stop device 144 pivoted at 145 to the left-hand arm or bar 137 and terminating at its lower end in a nose which rests on the ledge 143, the upper end of the latch or lever member 144 terminating in a horizontally bent finger piece or key 146. A draw spring 147 (Fig. 7) connected at one end to the latch and at the opposite end to a pawl 148 pivoted at 149 to the outer face of said arm 137 normally maintains the latch in the position shown in Figs. 8 and 9. The pawl 148 is comprised in ribbon mechanism to be hereinafter described. This position of the latch is determined by stop devices comprising a lateral pin 150 projecting laterally inward from the bar 131, which pin engages with an enlarged hole 151 formed in the latch. By pressing rearward against the key 146 the spring 147 is overcome and the nose of the latch or detent 144 is swung forward past the stop ledge 143 so that the main and supplementary frames may be lowered through the force of gravity to the position shown in Fig. 16. One purpose of this operation is to render operative the manifold cut-out devices.

The manifold cut-out or type shield devices in the present instance comprise, as best appears from Figs. 1, 7, 9, 11 and 16, a plate 152 of thin sheet metal curved slightly to conform to the surface of the platen and secured to the under side of the rod 141 of the supplementary bail frame at its left-hand end portion by screws 153, the rod being cut away to provide a flat surface as indicated at 154. The plate 152 is provided with rectangular openings 155 to lighten it. Its lower edge portion is offset forward or pressed outward to provide a trough-like portion or groove 156 facing the platen and extending the full length of the plate 152 along its lower side. This groove is defined at the top and bottom by parallel edges 157 which are in a different plane behind the plane of the groove and are adapted to contact with the platen or the paper thereon and maintain the bottom of the groove out of contact with the same. The front face of the metal forming the bottom of the groove is adapted to receive the impact of the types through the outer or shorter bill sheet and the construction is such that as a result of the type blows only the edges 157 will cause impressions to be made on the underlying sheet or sheets, resulting in parallel lines like ruled lines being off-set on said underlying sheets instead of as in prior constructions a black smudge the full width of the manifold cutout strip. In other words, the unsightly smudging and blacking of the underlying sheets resulting from the use of prior constructions of manifold cut-outs is avoided by the present invention. It will be understood that the manifold cut-out or type shield is arranged in the present instance to coöperate only with the work sheet or sheets at the left-hand end portion of the platen. It is of such length as to extend only through the length of the shorter work sheet or check hereinafter more particularly described and its purpose is to prevent certain items or entries written on the check from being duplicated on the underlying sheet or sheets by interposing in the path of the types a shield for said underlying sheet or sheets, thus cutting out or preventing the impressions from being manifolded or duplicated on certain of the sheets. When the pressure bail frames are in the Fig. 9 position the manifold cut-out is raised above the printing line so that it is inoperative, with the result that the type impressions will be made on all the work sheets that are opposite the printing point. When, however, the bail frames are lowered as in Fig. 16, the manifold cut-out is brought opposite the printing point covering the same so that it will act as an anvil or backing, so that the type impressions will be made on the work sheet or sheets that may be outside or forward of it but shielding such work sheet or sheets as may be between said cut-out and the printing face of the platen, and so preventing the latter sheet or sheets from receiving the type impressions, said sheets receiving instead only the parallel line imprints above referred to.

As has been stated the main and supplementary bail frames are lowered by gravity from the Fig. 9 to the Fig. 16 position when through a hand operation applied to the key 146 the stops or detents are rendered inoperative; that is to say, the manifold cut-out is movable as the result of a manual operation from inoperative to operative position. In the present instance means are provided for automatically restoring the manifold cut-out from operative to inoperative position. Said means comprise an engaging device or roller 158 mounted on a slide 159 which is adjustable on the square rod 136 and is held set in desired positions therealong by means of a set screw 160. The roller 158 is adapted to coöperate with a cam member in the form of an angular arm 161 fixed by set screws 162 to the underside of the front rail 6 at the middle of the machine. The cam arm extends rearward and upward and terminates in a curved edge or double cam 163 having right and left camming portions. When the manifold cutout 152 is inoperative as in Fig. 9, the roller 158 is above the cam 163; but when the key 146 is operated to lower the cut-out device and the bail frames, the roller 158 is swung down so that its path is intercepted by the cam 163. Consequently when in the course of movement of the carriage either toward the right or toward the left, the roller is brought into contact with the cam, it will ride up on said cam and will be swung up carrying with it the rock shaft 136 which in turn will effect both the bail frames and the cut-out 152, restoring these parts from the Fig. 16 to the Fig. 9 position. During the course of this restoring movement the latch 144 will swing rearward over the stop 143 to automatically retain the parts in the Fig. 9 position. It will be understood, of course, that the manifold cut-out may be lifted manually from the Fig. 16 to the Fig. 9 position by turning the shaft 136 by hand either by using the roller 158 and slide 159 as a finger piece or otherwise; but in using the invention in connection with the work for which it was more particularly designed, it is preferable to lower the cut-out and bail frames by hand and lift them automatically, as will appear more clearly when the operation is explained in detail in connection with the work aforesaid.

It will be observed that there is provided a manifold cut-out device comprising a member or plate having a portion off-set away or outward from the surface of the platen, this off-set portion being intermediate two edge portions which are in a different plane from the off-set portion and which contact with the surface of the platen or the paper thereon; that the manifold cutout device or type shield is on the second of two frames, the first or main frame being pivoted on a carriage and the second frame being pivoted on the first frame; that the main and secondary frames constitute a two-part gravity frame; that associated with the frames or two-part frame are stop, detent or latch devices normally maintaining the type shield or cut-out out of operative position; that when the stop devices are rendered inoperative the frames drop through the force of gravity carrying with them the shield or cut-out device which is thereby brought to operative position opposite the printing point; that the shield is rigid on said second frame which frame is a U-shaped bail provided with one or more pressure rolls which coöperate with the platen, said U-shaped bail being mounted on a second oppositely disposed U-shaped or main bail; and that this second U-shaped bail carries a roll or engaging device which coöperates with a cam during carriage movements to restore the manifold cut-out device and bail frames from lower or operative to upper or inoperative position.

Carriage controlling stops are provided comprising a stationary stop or one mounted on the frame of the machine and which may be termed a frame stop. This stationary or frame stop is of ordinary construction and is designated as 164, being pivotally supported on the rail 6 at about the middle of its length. Coöperative with the stop 164 is a carriage carried stop 165 which is always in line with the stop 164. The stop 165 is of ordinary construction and is slidably mounted at the left-hand side of the carriage, being provided with detent or locking devices by which it may be set where desired. Between the carriage-carried stop 165 and the stationary stop 164 is arranged a second carriage-carried stop. This second carriage-carried stop is in the form of a plate-like member 166 provided with parallel down-turned ears 167 perforated to fit loosely over the square rock shaft 136 near the left-hand end thereof. From the rock shaft the plate 166 extends forward over the front bar 9 of the carriage and its front end portion is curved or inclined downward so that when the plate rests on the front bar it will be in line with the stationary stop 164 and will coöperate with said stop to arrest the carriage when the latter is restored to the right. In order to prevent sliding movement of the stop 166 along the shaft 136, devices are provided comprising two parallel pins 168 and 169 which project radially from the shaft 136. Between said pins is loosely confined the right-hand ear 167. These pins, it will be understood, act as limiting stops and confine the stop 166 to a slight movement lengthwise of the shaft 136. In addition the stop pin 168 has the further function of providing a connection between the shaft 136 and the stop 166 of a character to transmit movement from the shaft to the stop; that is, when the shaft is turned from the Fig. 9 to the Fig. 16 position the pin 168 will engage the under side of the stop plate 166 and will lift said plate or swing it upward so that it will be out of line with the stop 164 and will, as a consequence, be ineffective to arrest the carriage. If at this time the carriage should be returned toward the right, the stop 166 will pass freely over the stop 164 and the carriage will be arrested in a position farther to the right than before by the engagement of the stop 165 with the stop 164. The usual carriage-carried margin or end stop (not shown) may also be adjustably mounted on the carriage at the right-hand end thereof to coöperate with the stop 164 at the end of the line. When the frame comprising the shaft 136 is restored from the Fig. 16 to the Fig. 9 position, the stop 166 will again drop down to operative position in line with the stop 164. It will thus be seen that means are provided for automatically controlling the carriage-carried stop 166 by the means or devices which control also the type shield or ribbon cut-out devices so as to vary the marginal position of the carriage when moving toward the right. Further it will be noted that when the stop 166 is in operative position or in line with the stop 164, the type shield device is in inoperative position and that when the type shield is moved to operative position as a result of actuating the key 146, the stop 166 will concurrently be moved to inoperative position; while when the type shield is restored automatically to inoperative position during movements of the carriage, the stop 166 will concurrently be restored to operative position.

The two-part bail frame in addition to supporting and controlling type shield and carriage stop devices also provides a support for denominational or variable side gage devices which will be described in connection with Figs. 1 to 4 and 7 to 9. Said devices are mounted at the left end of the main part of the bail frame, being supported on a bar or plate-like arm 170 which is arranged just inside the left-hand arm 137 and extends rearward parallel therewith. The forward end of the bar or support 170 is notched to fit over the square shaft 136 while the rear end of said bar is fixed to said arm 137 by a headed screw 171 which passes transversely through the arm 137 and is threaded into the arm 170. The construction is such that the arm 170 is held in rigid relationship with the arm 137 and the frame of which it is a part. The bar 170 terminates at the left of the platen and of the paper apron or guiding devices 95, 92 so that the rear end portion of said bar 170 may itself act as a side gage. In addition the bar provides a support for a plurality or set of variably settable gages, three in the present instance, although, of course, the number may be varied, said gages being in the form of plates, blades or bars 172, 173 and 174 of a thickness corresponding to the distance of a letter space movement of the carriage and which are arranged side by side. Said bars are slotted as indicated at 175 to receive two headed screws 176 which pass leftward through the slots 175 and are threaded into the bar 170, thus slidably securing said bars 172, 173 and 174 to the bar or support 170. The bars or blades 172—174 may be moved or slid backward and forward along the supporting screws 176 and in vertical planes transverse of the platen to an extent limited by the ends of the slots 175 which are adapted to engage with said screws to limit such movement. This slidable movement is for the purpose of moving said bars or slides 172—174 into and out of operative position. The relationship of said gages or devices in respect to each other considered lengthwise of the platen never varies, however, but always remains constant, as does also their relation to the platen considered lengthwise thereof. In order to prevent the slides from being accidentally displaced after they have once been set, it is preferred to provide devices in the form of friction plates 177 of thin spring metal and which when made are slightly bent or curved. Said plates are arranged between the slides and are themselves prevented from sliding movements by the screws 176 which pass through round holes 178 in said plates. It will be understood that when the plates are straightened out flat by tightening the screws 176, they will take up all looseness in the slides and will exert sufficient friction to prevent accidental movement thereof while allowing a ready back and forth adjustment of said slides. Such adjustments are conveniently accomplished by means of keys or finger pieces in the form of cylindrical buttons 179 suitably secured to the tops of the slides. In order not to interfere with each other, the buttons are spaced apart lengthwise of the slides, the middle button being at the middle of its slide and the other two buttons at opposite ends of their respective slides. Preferably the tops of the buttons are provided with indicating marks to facilitate the proper selection of the slides. In the present instance, the right-hand button is marked "1", the middle button is marked "10" and the left-hand button is marked "100". These three slides, together with the rear end portion of the bar 170, constitute a variable side gage which is intended to coöperate with the short bill sheet or check that is fed over the left-hand end portion of the platen, while the side gage 131 on the main paper table coöperates with the long or main work sheet or sheets.

One mode of operation will be specifically explained later. At this time it need only be said that the slidable gages 172—174 are separately effective to position denominationally the front-fed work sheet with which they may coöperate, so that this work sheet or check may be variably positioned widthwise in any one of a plurality of denominational positions with the result that while the entries on successive checks, whatever their denomination, may always be begun close to the dollar mark on the check, they will, nevertheless, properly be entered denominationally on the main sheet in the single underlying denominational column. This result will follow because while the main sheet remains in an unvarying position lengthwise of the platen, each successive check may be varied denominationally in position as it is entered in the machine according to the amount to be written on it, such variation being effected by setting the proper one of the slides in operative position and gaging the check by it. In this connection it will be borne in mind that the thickness or width of each slide is equal to the length of a letter space movement of the carriage. For example, assuming all of the slides to be set in rearmost position as in Figs. 4 and 7 they will be allowed to remain in this position if the amount on the first check is in units of dollars. If the amount of the second check is in tens of dollars the "1" slide is drawn forward as shown by the dotted lines in Fig. 4, leaving the "10" slide effective so that the second check will be positioned one unit space to the left of the first check; while if the amount is in hundreds of dollars the "10" slide is also drawn forward, leaving the "100" slide effective. An entry in one thousands of dollars will require that all three slides be drawn forward to inoperative position, leaving the end of the bar 170 to act as a side gage. Greater amounts will of course require the employment of additional slides.

In order to facilitate the movement of the slides forward out of operative position, the rear end of the slide 172 has driven into it a headed pin 180, the head whereof overlaps slightly the rear face of the slide 173. Said slide 173 in turn has on its rear end a headed pin 181 which overlaps slightly the slide 174. As a result if all the slides are in rearmost position as in Fig. 4 and it be desired to render the bar 170 operative, it is only necessary to press or pull forward the "100" button 179. If this is done the head of the pin 180 will pick up the slide 173 and the head of the pin 181 will thereupon pick up the slide 174 so that all three slides will be simultaneously moved forward. Similarly the actuation of the "10" button 179 will operate to simultaneously move forward the slides 173 and 174. A similar function will be exercised by the devices 180 and 181 if all of the slides are forward in inoperative position. For example, a rearward push applied to the "1" key will be transmitted through the pin 181 to the slide 173 and thence through the pin 180 to the slide 172, causing all three slides to move rearward together.

It will be observed that I provide denominational side gages, stops or guides which in the present instance are separately key controlled, these gages being arranged side by side and slidably mounted so that they may be moved into and out of operative position transversely of the platen; that said gages are so located in respect to one end of the platen that when in operative position the throwing off of the paper apron or guide, the one in the present instance at the left of the platen, will open a throat or way for the introduction of a work sheet or check which may be front fed with its left edge coöperative with the selected denominational gage; that the denominational gages are mounted at the front side of the platen on a movable support while at the opposite or rear side of the platen and mounted on the paper table is another gage for coöperation with a work sheet introduced from the rear of the machine in the ordinary way; that a separate finger piece or key is provided for each denominational gage; and that by means of connecting devices between gages each key may be caused to actuate both its end gage and one or more of the other gages.

It is desirable in the present instance to duplicate, in ink, the impressions on the portion of the record sheet that underlies the outer work sheet or check, instead of effecting such duplication by carbon paper or the like. Supplementary or secondary ribbon mechanism is accordingly provided for making such duplicate impressions. Said supplementary ribbon mechanism in the present case is mounted on the carriage of the machine and will be described in connection with Figs. 7-9, 13, 14 and 16. A U-shaped bracket 182 is secured by screws 183 to the top of the left-hand end bar 11 forward of the platen axle. The upstanding ears of this bracket are perforated to provide bearing openings for the collar portion 184 of a ratchet wheel 185 which is arranged inside of the bracket in position to be actuated by the pawl 148 which coöperates with the front, upper portion of said ratchet wheel. Passing through the collar portion and secured in fixed relation therewith by a set screw 186 is a shaft 187 parallel with the platen axis. Said shaft extends leftward beyond the bracket and provides a support for two parallel ribbon carriers or spools 188 and 189 of ordinary construction each comprising flanges and a connecting core. These spools are mounted side by side loosely on the shaft and are separated by an enlarged portion 187$^a$ of the shaft. The right-hand spool is loosely confined between this collar portion 187$^a$ and a disk 190 which is fixed to the left-hand ear of the bracket 182 and supports at its top a curved hood or roof 191 which overhangs the spools and provides a housing therefor. The left-hand spool 188 is loosely confined between the collar portion 187$^a$ and a knurled button or cap 192 which is screwed into the outer end of the shaft 187. The inner opposing faces of the spools are provided with a series of projections or teeth 193 for coöperation with a connector or lever 194 which is arranged in a slot 195 in the collar portion 187$^a$ of the shaft and is pivoted between its ends. One arm of the lever 194 terminates in oppositely disposed teeth 196 while the opposite arm provides a finger piece 197. A spring detent 198 screwed to the collar 187$^a$ coöperates with the connector 194 to maintain it in engagement with one or the other of the spools. When the connector is set as in Fig. 7, one of its teeth 196 will engage with the teeth 193 of the spool 189, thereby connecting said spool to turn with the shaft 187. In order to reverse the feed of the ribbon, the handle 197 is switched toward the right to connect the other tooth 196 with the teeth 193 of the spool 188, this operation causing said spool to turn with the shaft and operatively disconnecting the spool 189 from said shaft.

Wound on the spools is a narrow supplementary ribbon 199. Following the course of this ribbon from the spool 188 to the spool 189, said ribbon passes downward from the back of the spool 188 over a diagonal turning bar 200 which is formed by cutting a triangular slot 201 in the upright portion 202 of an angular bracket 203 fixed by screws 204 to the outer face of the end bar 11. The course of the ribbon is changed by the turning bar 200, and it is directed inward horizontally at right angles passing over the left-hand portion of the platen opposite the printing line thereon until it reaches a guiding or turning device. Said device in the present instance is formed by the upright U-shaped portion 205 of a wire guide which further comprises a horizontally extending portion 206 bearing rotatably in a housing or pocket 207 fixed by soldering or otherwise to the front edge portion of the paper apron 109. The wire 206 bears frictionally in this pocket so that it will be held either in upright position as shown by full lines in Fig. 13 or may be turned down as shown by dotted lines in said figure to carry the supplementary ribbon out of use. The inner end of the wire 206 is bent at an angle and coöperates with a notch in the paper apron 109 to limit turning movement of the guide 205 in one direction. This construction also prevents the guide from being accidentally displaced from its bearing. Passing rearward around the guide 205 the ribbon 199 extends back behind its outer ply toward the left, thus providing two ribbon plies which, when the guide 205 is upright, are arranged over the printing line behind the apron extension 95, these plies being slightly longer than the width of the outer bill sheet or check. The rear ply of the ribbon at its left is led over a diagonal guide or turning bar 208 formed by cutting a second triangular slot 209 in the upright bracket 203. This turning bar 208 deflects the ribbon so that it passes up to the spool 189 at its back. The ribbon pawl 148 is normally maintained engaged with the ratchet wheel 185 by the spring 147, and consequently when the pressure bail is depressed from the Fig. 9 to the Fig. 16 position, said pawl will operate to turn the ratchet and communicate motion to the connected ribbon spool winding the ribbon 199 thereon. The ribbon will thus be moved or fed to a slight extent longitudinally between said ribbon spool and the guide 205 and will be unwound to a corresponding extent from the loose ribbon spool. When the pressure bail is lifted or restored from the Fig. 16 to the Fig. 9 position the feed pawl will slide idly over its ratchet wheel so that at the next depression of the pressure bail a further ribbon feeding movement will be communicated to the supplementary ribbon. It will be seen therefore that the supplementary ribbon is fed automatically when the pressure bail comprising the rock shaft 136 and arms 137 is depressed to lower the manifold cut-out or type shield.

The supplementary ribbon is entirely distinct from and controlled independently of the main ribbon of the machine. Said main ribbon, shown in Figs. 1 and 10 and indicated by the numeral 210, is threaded through a vibratory carrier or vibrator 211 of ordinary construction which is moved up and down to cover the printing point at the middle of the machine when the printing keys are actuated. The feeding and controlling of the main ribbon 210 may be effected by devices of the usual Remington construction.

The present embodiment of my invention was more particularly designed for use in a system of municipal accounting wherein a series of checks is to be written successively and certain items of the checks duplicated simultaneously on a schedule sheet or credit side of the cash book. The checks are the shorter work sheets and a facsimile of one of them is shown in Fig. 17 where it is designated for convenience as c. The schedule sheet or record sheet is fragmentarily reproduced in Fig. 18 on a somewhat smaller scale than the check and will be designated as d. This record sheet has to be written entirely in ink but the system requires several duplicate record sheets and these may accordingly be provided in a pack with interleaved carbon sheets. One such duplicate record sheet is shown in Fig. 11 where it is designated as d' while the interleaved carbon sheet is designated as j. The check c, it will be observed, contains near the top a blank for its number which is usually applied by a stamp. The "pay to the order" blank on the check contains two lines, the first line for the name of the payee and the second for his address. These two entries are to be duplicated on the column headed "This space for," etc., on the record sheet d.

On the same line of the check with the address of the payee and following the dollar sign, the amount is to be written in figures. It is essential that this amount on each check be begun as close as possible to the dollar sign in order to prevent the insertion of additional figures between the dollar sign and the first figure of the correct amount. This requirement necessitates that each check shall be positioned denominationally lengthwise of the platen, and such positioning is accomplished by means of the denominational gage in accordance with the amount to be filled in. Said amount is duplicated in the "amount due" column on the sheet d. The next or "dollars" line of the check requires the amount to be written in words, and the line following that is filled in with the name of the particular pay-roll to which the payee is assigned. Neither the "dollars" line nor the "pay-roll" line on the check is to be duplicated on the record sheet and consequently the manifold cut-out is brought into use when these lines are filled in so as to prevent their reproduction on the underlying record sheet. The entries reproduced on the record sheet from the check are written by means of the supplementary ribbon but all of the other entries to be made on the record sheet in the columns to the right of the amount column, are exposed and will be filled in through the main ribbon. It is not necessary to describe specifically these other columns since they do not particularly concern us in the present case. It need only be said that they may readily be filled in by the use of the tabulating mechanism.

From what has been said heretofore it will be understood that the checks c are fed over the left-hand end portion of the platen and controlled by the devices associated with said end portion while the record or main sheets d and d' are fed over the entire length of the platen and underlie at their left-hand end portions. All the feed rollers being thrown off, the sheets d and d' of the interleaved carbon are introduced from the back of the machine over the paper table 123, their left-hand edges being gaged by the gage or guide 131 with their tops introduced under the rolls 142 of the pressure bail. Said sheets being properly positioned, the feed rolls are thrown on again and then the roller 77, together with the apron 92 and extension 95, are thrown off as illustrated in Fig. 11 to facilitate the front feeding or introduction at the front side of the platen of the check c. This check will be gaged according to its amount by the denominational gage devices. At this time the manifold cut-out is raised out of operation and the carriage stop 166 is in effective position. It will be observed from Fig. 11 that the check c is forward of the manifold cut-out while the other work sheets are behind it; also that the supplementary ribbon 199 is between the check and the sheet *d*. After the check has been properly positioned to bring its first line opposite the printing point the left-hand feed roll is thrown on and the carriage is moved to the right until arrested by the stop 166. The name of the payee is then filled in, the parts being arranged so that this name will begin at the beginning of the name blank. The check is then line spaced a single space and the address of the payee is filled in. These two items are duplicated on the record sheet. Next the proper tabulator key is operated to release the carriage and move it toward the left until arrested in position for filling in the amount. The parts are so arranged that the first figure of the amount will be just to the right of the dollar sign on the check and as it is filled in this amount will be properly duplicated in the "amount due" column on the record sheet. In the illustrations the amount is $500 so that the check has been gaged by means of the "100" gage or slide. The work sheets are then line spaced. The key 146 is actuated to render the manifold cut-out operative and lift the carriage stop 166 and the carriage is then restored from left to right until arrested by the stop 165. This brings it into the proper position for beginning the writing of the "dollars" line at the extreme left of said line. As stated, this entry is not duplicated on the record sheet since the types will strike against the manifold bar or cut-out. The only result will be that the edges 157 of the cut-out will cause faint lines on the record sheets. Preferably the record sheet is so ruled that these lines will practically coincide with the cross lines on said sheet and hence their prominence will be lessened. The "pay-roll" line is also filled in while the manifold cut-out is operative; and various entries in the distributing columns on the right-hand portion of the record sheet may also be filled in by the use of the tabulator, the printing devices and the main ribbon. This disposes of the first check which may then be removed and a new check introduced. Should this new check be for an amount, say, in tens of dollars the "10" stop or slide 173 is rendered operative so that the second check will be positioned one letter space to the right of the first check, thus providing for the writing in of the amount in figures close to the dollar sign as before, and also providing for its proper denominational positioning under the first amount in the "amount due" column on the record sheet. In restoring the carriage from left to right to begin the writing of the second check, the roller 158 will ride up on the cam 163, thus lifting the manifold cut-out device out of operation and restoring the stop 166 to effective position so that the carriage will be arrested by said stop. It is believed that this explanation with what has previously been said will afford a full understanding of the use of the invention in connection with the system employing the work sheets *c* and *d*.

In some cases it is preferable to print the checks in blank on a continuous strip from which the individual checks are successively torn after being filled in on the typewriter. When a check strip of this character is employed, the denominational side gage mechanism is dispensed with, the gages being slid forward out of operative position, and use is made of a scale device to position the check strip variably. Such a scale device is shown in Fig. 15 and comprises a short scale plate 212 mounted at the upper end of an integral arm 213 which terminates at its lower end in a slide portion 214. Said slide 214 frictionally engages in a horizontally arranged grooved guide plate 215 secured to the left-hand front portion of the paper guide or apron 92. The scale plate 212 is arranged just above the upper edge of said apron. After having once been set along the guide 215, the scale device 212 is not disturbed so long as the character of the check strip remains unchanged. With the check strip use is also made of the supplementary paper table 127, the rear unused portion of the check strip resting on said table 127 as shown in Fig. 12 wherein such check strip is designated by the reference numeral *s*. The check strip may thus be handled freely without disturbing or without interference from the main or underlying work sheets which are fed over the main paper table 123 as before. In using the check strip *s* the left-hand feed rolls are thrown off and the check strip is adjusted by means of the scale plate 212 in accordance with the amount to be written. If the amount of the first check is in units of dollars, the left-hand edge of the strip is adjusted in line with the first indicating mark at the right-hand side of the scale plate. The left-hand feed is then thrown on and the check is written as has heretofore been described. If the amount of the next succeeding check is, say, in one hundreds of dollars, the left-hand feed roll is thrown off and the check strip is adjusted with its left-hand edge opposite the third indicating mark counting from the right-hand end of the scale; and so on.

It will of course be understood that the present invention may be employed for writing other styles of work than that hereinbefore described. It will also be understood that the invention is so applied to the machine that it will not interfere with the use thereof in ordinary ways, for instance, the machine may be employed to write a wide work sheet extending from one end of the platen to the other, all impressions being made from the regular ribbon 210. All that it is necessary to do preliminary to making such use of the machine is to turn down the guide 205 of the supplementary ribbon from the full line position in Fig. 13 to the dotted line position. This resetting of the guide carries the printing portion of the supplementary ribbon down below the printing line on the platen and renders it inoperative.

Various changes may be made without departing from my invention.

What I claim as new and desire to secure by Letters Patent, is:—

1. In a typewriting machine, the combination of a carriage, a platen, a set of paper controlling devices coöperative with one end portion of the platen and releasable by a key at the same end of the platen, another set of paper controlling devices coöperative with the opposite end portion of the platen and releasable by a second key at the opposite end of the platen from the first key, said second key being effective to simultaneously release said both sets of paper controlling devices.

2. In a typewriting machine, the combination of a carriage, a platen, paper controlling devices coöperative with the left-hand end portion of the platen and releasable by a key at one end of the platen, other paper controlling devices coöperative with the right-hand end portion of the platen and releasable by a second key at the end of the platen opposite from that at which the first key is located, said second key being also effective to release the paper controlling devices at the left-hand end portion of the platen.

3. In a typewriting machine, the combination of a carriage, a platen, paper controlling devices coöperative with the left-hand end portion of the platen, said paper controlling devices being releasable by a key at the left-hand end of the platen, other paper controlling devices coöperative with the right-hand end portion of the platen and releasable by a key at the right-hand end of the platen, said last recited key being also effective to release the paper controlling devices at the left-hand end portion of the platen.

4. In a typewriting machine, the combination of a carriage, a platen thereon, a paper feed roller coöperative with one end portion of the platen, a second paper feed roller coöperative with the opposite end portion of the platen, a release key at one end of the platen for controlling the first recited paper feed roller, and a second release key at the opposite end of the platen for controlling both of said paper feed rollers.

5. In a typewriting machine, the combination of a carriage, a platen, a shaft extending lengthwise of said platen, two sleeves mounted on opposite end portions of said shaft, separate keys for turning said sleeves, connections for transmitting movement from one of said sleeves through said shaft to the other of said sleeves, said connections being ineffective to transmit motion in the opposite direction from the last recited sleeve to the first, a paper feed roller controlled by one of said sleeves, and a second paper feed roller controlled by the other of said sleeves.

6. In a typewriting machine, a manifold cut-out device for typewriting machines comprising a strip off-set outward from the face of the platen and contactive with the platen or the paper thereon only along the parallel edges of said strip.

7. In a typewriting machine, a manifold cut-out device for typewriting machines comprising a member or plate having a portion off-set away from the platen surface to receive the impacts of the types and having also a parallel portion to contact with the platen or the paper thereon.

8. In a typewriting machine, a manifold cut-out device for typewriting machines comprising a member or plate having portions in one plane and contactive with the platen and having also an intermediate portion in another plane, said intermediate portion receiving impacts of the types.

9. In a typewriting machine, the combination of a carriage, a platen, a frame pivoted on the carriage, a second frame pivoted on the first frame, a type shield on said second frame, and stop devices normally maintaining said type shield out of operative position.

10. In a typewriting machine, the combination of a carriage, a platen, a frame pivoted on the carriage, a second frame pivoted on the first frame, a pressure roll on said second frame, and a type shield rigid on said second frame.

11. In a typewriting machine, the combination of a carriage, a platen, a frame pivoted on the carriage, a second frame pivoted on the first frame and comprising a rod, a pressure roll rotatable on said rod and contactive with the platen, and a type shield supported by said rod.

12. In a typewriting machine, the combination of a carriage, a platen, a frame pivoted on the carriage, a second frame pivoted on the first frame and comprising a rod, a pressure roll rotatable on said rod and contactive with the platen, and a plate fixed to said rod and conforming to the surface of the platen, said plate being provided with a portion movable into and out of the path of the types.

13. In a typewriting machine, the combination of a carriage, a platen, a frame pivoted on the carriage, a second frame pivoted on the first frame, a spring pressed latch pivotally supported by said first frame, a stop on the carriage with which said latch coöperates, and a type shield on said second frame.

14. In a typewriting machine, the combination of a carriage, a platen, a frame pivoted on the carriage, a second frame pivoted on the first frame, a spring pressed latch pivotally supported by said first frame, a stop on the carriage with which said latch coöperates, a type shield on said second frame, and a key for actuating said latch against its spring pressure.

15. In a typewriting machine, the combination of a carriage, a platen, a frame pivoted on the carriage, a second frame pivoted on the first frame, a spring pressed latch pivotally supported by said first frame, stop devices for limiting pivotal movement of said latch, a stop on the carriage with which said latch coöperates, and a type shield on said second frame.

16. In a typewriting machine, the combination of a carriage, a platen, a frame pivoted on the carriage, a second frame pivoted on the first frame, a spring pressed latch pivotally supported by said first frame, a stop on the carriage with which said latch coöperates, and a type shield on said second frame, said latch being manually movable to disengage from said stop and permit said type shield to move through the force of gravity into operative position.

17. In a typewriting machine, the combination of a carriage, a platen, a frame pivoted on the carriage, a second frame pivoted on the first frame, a latch pivotally supported by said first frame, a stop on the carriage with which said latch coöperates, a type shield on said second frame, said latch being manually movable to disengage from said stop and permit said type shield to move through the force of gravity into operative position, and means for restoring said latch into engagement with said stop during movement of said type shield out of operative position.

18. In a typewriting machine, the combination of a carriage, a platen, a frame pivoted on the carriage, a second frame pivoted on the first frame, a spring pressed latch pivotally supported by said first frame, a stop on the carriage with which said latch coöperates, a type shield on said second frame, said latch being manually movable to disengage from said stop and permit said type shield to move through the force of gravity into operative position, and means for restoring said latch into engagement with said stop when moving said type shield out of operative position, said last recited means comprising a stationary cam and an engaging device on said first recited frame.

19. In a typewriting machine, the combination of a carriage, a platen, a frame pivoted on the carriage, a second frame pivoted on the first frame, a manifold cut-out device on said second frame, and hand controlled stop devices coöperating with said first frame to maintain the cut-out devices in inoperative position, said cut-out devices being rendered operative through gravity when the stop devices are rendered inoperative.

20. In a typewriting machine, the combination of a carriage, a platen, a frame pivoted on the carriage, a second frame pivoted on the first frame, a manifold cut-out device on said second frame, and hand controlled stop devices coöperating with said first frame to maintain the cut-out devices in inoperative position, said cut-out devices being rendered operative through gravity when the stop devices are rendered inoperative, and cam devices operating through movements of the carriage to overcome the force of gravity and restore the cut-out devices to inoperative position.

21. In a typewriting machine, the combination of a platen, a carriage, a U-shaped bail mounted thereon, an oppositely disposed U-shaped bail mounted on the first U-shaped bail, a pressure roll on the second recited bail, and a manifold cut-out device controllable by said bails.

22. In a type-writing machine, the combination of a platen, a carriage, a U-shaped bail mounted thereon, an oppositely disposed U-shaped bail mounted on the first U-shaped bail, a pressure roll on the second recited bail, and a manifold cut-out device controllable by said bails, said manifold cut-out device being mounted directly on said second recited bail.

23. In a typewriting machine, the combination of a platen, a carriage, a U-shaped bail mounted thereon, an oppositely disposed U-shaped bail mounted on the first U-shaped bail, pressure roll devices mounted on one end of said second recited bail, and a manifold cut-out device mounted on the opposite end of said bail.

24. In a typewriting machine, the combination of a platen, a carriage, a frame movably mounted thereon, pressure roll devices on one side of said frame and coöperative with the platen, and a manifold cut-out plate on the opposite end of said frame.

25. In a typewriting machine, the combination of a platen, a carriage, a frame movably mounted thereon, pressure roll devices on one side of said frame and coöperative with the platen, a manifold cut-out plate on the opposite end of said frame, means for manually controlling said frame, and means for automatically controlling said frame.

26. In a typewriting machine, the combination of a platen, a plurality of side gages arranged a letter space distance apart and movable transversely of the platen, a side gage adjustable lengthwise of the platen, and a paper guide coöperative with the platen and releasable to facilitate the front feeding of a work sheet that when introduced is positioned by said denominational side gage devices.

27. In a typewriting machine, the combination of a platen, denominational side gage devices for coöperation with one work sheet to position it denominationally lengthwise of the platen, a separate side gage for coöperation with another work sheet, and a paper apron coöperative with the platen and releasable to facilitate the front feeding of said work sheet.

28. In a typewriting machine, the combination of a platen, and denominational side gage devices, said devices comprising a plurality of gages or stops arranged side by side, and a paper guide coöperative with the platen and releasable to facilitate the front feeding of the work sheet whose side edge may coöperate with a pre-selected one of said gages.

29. In a typewriting machine, the combination of a platen, and denominational side gage devices, said devices comprising a plurality of gages or stops arranged side by side, means for moving said gages in planes transverse of the platen, a paper guide coöperative with the platen and terminating at the front side thereof below the printing point, and means for moving said paper guide in a plane transverse of the platen to facilitate the front feeding of a work sheet in coöperation with one or another of said gages.

30. In a typewriting machine, the combination of a platen, and denominational side gage devices, said devices comprising separate gages or stops movable transversely of the platen, a sheet metal paper apron coöperating with the surface of the platen and provided with a wire extension, and means for releasing said apron to facilitate the front feeding of a work sheet in coöperation with one or another of said gages or stops when the same is set in operative relationship with the platen.

31. In a typewriting machine, the combination of a platen, a carriage, a U-shaped bail mounted thereon, an oppositely disposed U-shaped bail mounted on the first U-shaped bail, a pressure roll on the second recited bail, and a side gage on the first recited bail.

32. In a typewriting machine, the combination of a platen, a carriage, a U-shaped bail mounted thereon, an oppositely disposed U-shaped bail mounted on the first U-shaped bail, a pressure roll on the second recited bail, and a set of key controlled denominational side gages mounted on the first bail.

33. In a typewriting machine, the combination of a platen, a carriage, a frame pivotally mounted thereon, pressure roll devices on said frame and coöperative with the platen, an arm fixed to said frame, and a set of slidable side gages supported on said arm.

34. In a typewriting machine, the combination of a platen, denominational side gages arranged at the front side of the platen for coöperating with work sheets as they are introduced into the machine to determine the relationship of said work sheets with the platen considered lengthwise of the latter, said gages having a constant relationship lengthwise of the platen, and a single side gage at the rear side of the platen, said single gage being adjustable lengthwise of the platen.

35. In a typewriting machine, the combination of a platen, a plurality of denominational side gages for coöperating with work sheets as they are introduced into the machine to determine the relationship of said work sheets with the platen considered lengthwise of the latter, said gages having a constant relationship lengthwise of the platen, and a single side gage, said single side gage being at the opposite side of the platen from the denominational gages being adjustable lengthwise of the platen.

36. In a typewriting machine, the combination of a carriage, a manifold cut-out device, means for controlling the same, and carriage stop devices automatically controlled by said means.

37. In a typewriting machine, the combination of a carriage, a manifold cut-out device supported thereon, a carriage stop, a coöperating frame stop, and conjoint means for controlling both said cut-out device and said carriage stop.

38. In a typewriting machine, the combination of a carriage, a manifold cut-out device supported thereon, a carriage stop, a coöperating frame stop, and means for moving said cut-out device into operative position and for automatically moving said carriage stop out of line with said frame stop.

39. In a typewriting machine, the combination of a carriage, a type shield, a carriage carried stop, a coöperating frame stop, and means for rendering said type shield and said carriage stop alternatively effective.

40. In a typewriting machine, the combination of a carriage, carriage stop devices, a type shield, and means for concurrently controlling said type shield and said stop devices.

41. In a typewriting machine, the combination of a carriage, carriage stop devices, a type shield, and manually operated means for concurrently controlling said type shield and carriage stop devices.

42. In a typewriting machine, the combination of a carriage, carriage stop devices, a type shield, and hand operated means for controlling said type shield so that it may move to effective position and for concurrently rendering said carriage stop devices ineffective.

43. In a typewriting machine, the combination of a carriage, carriage stop devices, a type shield, hand operated means for controlling said type shield so that it may move to effective position and for concurrently rendering said carriage stop devices ineffective, and automatic means for restoring said carriage stop devices to effective relationship and concurrently rendering said type shield ineffective.

44. In a typewriting machine, the combination of a carriage, printing devices, carriage stop devices, paper controlling devices for bringing a work sheet into and out of operative relationship with said printing devices, and means for concurrently controlling said paper controlling devices and said carriage stop devices.

45. In a typewriting machine, the combination of a carriage, a platen frame pivoted on the carriage, a second frame pivoted on the first frame, a type shield on said second frame, a carriage stop on said first frame, and devices for controlling said frame so that normally the carriage stop is in effective position when the type shield is in ineffective position.

46. In a typewriting machine, the combination of a carriage, a platen, a frame pivoted on the carriage, a carriage stop pivoted on said frame, a second frame pivoted on the first frame, a pressure roll on said second frame, and a type shield on said second frame.

47. In a typewriting machine, the combination of a carriage, a platen, a frame pivoted on the carriage and comprising a rock shaft, a carriage stop loosely mounted on said rock shaft, a second frame pivoted on the first frame and comprising a rod, a pressure roll rotatable on said rod and contactive with the platen, and a type shield supported by said rod.

48. In a typewriting machine, the combination of a carriage, a platen, a frame pivoted on the carriage and comprising a rock shaft, a carriage stop loosely mounted on said rock shaft, a second frame pivoted on the first frame and comprising a rod, a pressure roll rotatable on said rod and contactive with the platen, and a manifold cutout plate rigidly secured to said rod.

49. In a typewriting machine, the combination of a carriage, a platen, a stationary stop, a coöperative stop on the carriage, paper controlling devices, and means for controlling said devices, said carriage stop being thrown into and out of line automatically with said stationary stop by said means.

50. In a typewriting machine, the combination of a carriage, a two-part gravity frame thereon, a carriage stop on said gravity frame, a coöperating stationary stop, and automatic means effective on said frame to move said carriage stop relatively to said stationary stop.

51. In a typewriting machine, the combination of a carriage, a two-part gravity frame thereon, a carriage stop on said gravity frame, a coöperating stationary stop, and automatic means operative during movements of the carriage to move said carriage stop into line with said stationary stop.

52. In a typewriting machine, the combination of a carriage, a shaft thereon, a carriage stop loosely mounted on said shaft, two pins radial on said shaft and defining the position of said carriage stop lengthwise of said shaft, one of said pins causing the stop to rotate with said shaft, means for rocking said shaft, and a frame stop.

53. In a typewriting machine, the combination of a carriage, a two-part gravity frame thereon, a carriage stop on said frame, a coöperating frame stop, automatic means operative during movements of the carriage to move said carriage stop into line with said frame stop, and a second carriage stop constantly in line with said frame stop.

54. In a typewriting machine, the combination of a carriage, a platen, a frame stop, a coöperative stop on the carriage, paper controlling devices, means for controlling said devices, said carriage stop being thrown into and out of line automatically with said frame stop by said means, and a second stop on said carriage, said second stop being constantly in line with said frame stop.

55. In a typewriting machine, the combination of a carriage, a carriage carried stop, a coöperating stationary stop, means operating automatically as the result of movements of the carriage to move said carriage stop into line with said stationary stop, hand operated means for moving said carriage stop out of line with said stationary stop, and a second carriage carried stop constantly in line with said stationary stop.

56. In a typewriting machine, the combination of a carriage, a paper table pivoted thereon, a second paper table underlying the first paper table and pivoted on said carriage, and means for connecting said paper table so that when one is swung on its pivot the other is concurrently swung on its pivots.

57. In a typewriting machine, the combination of a carriage, a paper table pivoted thereon, a second paper table underlying the first paper table and pivoted on said carriage, and means for connecting said paper table so that when one is swung on its pivots the other is concurrently swung on its pivots, said means comprising an angular arm fixed to one of said tables, and a second arm adjustable on said first arm and engageable with the second of said tables.

58. In a typewriting machine, the combination of a carriage, a paper table pivotally mounted thereon, a second paper table pivotally mounted on said carriage, and means for connecting said paper tables, said means comprising an angular arm rigid on one of said paper tables, and a second arm adjustably secured by a set screw to the first arm, said second arm underlying the other of said paper tables.

59. In a typewriting machine, the combination of a carriage, a paper table pivoted thereon and extending substantially throughout the length of said carriage, a second and shorter paper table extending only partly the length of the carriage and underlying the first paper table, and connections between said paper tables whereby pivotal movement imparted to one is communicated to the other.

60. In a typewriting machine, the combination of a carriage, a manifold cut-out device, means for controlling said device, carriage stop devices automatically controlled by said means, and ribbon mechanism automatically controlled by said means.

61. In a typewriting machine, the combination of a carriage, a manifold cut-out device, means for controlling said device, carriage stop devices automatically controlled by said means, and ribbon feeding means operated by said first recited means.

62. In a typewriting machine, the combination of a carriage, a manifold cut-out device, a carriage stop, a coöperating frame stop, ribbon feeding mechanism, and means for controlling said cut-out device, said carriage stop and said ribbon feeding mechanism.

63. In a typewriting machine, the combination of a carriage, a manifold cut-out device supported thereon, a stop on said carriage, a coöperating frame stop, ribbon feeding mechanism on said carriage, and means for setting said cut-out device and said carriage stop and also for feeding said ribbon mechanism concurrently.

64. In a typewriting machine, the combination of a carriage, a type shield, a carriage carried stop, a coöperating frame stop, carriage carried ribbon feeding mechanism, and means for rendering said type shield and said carriage carried stop alternatively effective, said means also actuating said ribbon feed mechanism.

65. In a typewriting machine, the combination of a carriage, carriage carried stop devices, a carriage carried type shield, carriage carried ribbon mechanism, and means for concurrently controlling said type shield, said stop devices and said ribbon mechanism.

66. In a typewriting machine, the combination of a carriage, carriage carried stop devices, a carriage carried type shield, carriage carried ribbon mechanism, and manually operated means for concurrently controlling said type shield, said stop devices and said ribbon mechanism.

67. In a typewriting machine, the combination of a carriage, carriage carried stop devices, a carriage carried type shield, carriage carried ribbon mechanism, manually operated means for concurrently controlling said type shield, said stop devices and said ribbon mechanism, and automatic means for also controlling said type shield, said stop devices and said ribbon mechanism.

68. In a typewriting machine, the combination of a carriage, carriage carried stop devices, a carriage carried type shield, carriage carried ribbon mechanism, manually operated means for concurrently controlling said type shield, said stop devices and said ribbon mechanism, and means operated automatically by movements of the carriage to control also said type shield, said stop devices and said ribbon mechanism.

69. In a typewriting machine, the combination of a carriage, carriage carried stop devices, a carriage carried type shield, carriage carried ribbon mechanism, and means operated automatically by movements of the carriage to control said type shield, said stop devices and said ribbon mechanism.

70. In a typewriting machine, the combination of a carriage, a platen frame pivoted on said carriage, a second frame pivoted on the first frame, a type shield on said second frame, a carriage stop on said first frame, ribbon mechanism including a feed pawl on said first frame, and devices for controlling said frame so that normally the carriage stop is in effective position when the type shield is in ineffective position.

71. In a typewriting machine, the combination of a carriage, a platen, a frame pivoted on the carriage, a carriage stop pivoted on said frame, ribbon feed mechanism, said mechanism including a feed pawl pivoted on said frame, a second frame pivoted on the first frame, a pressure roll on said second frame, and a type shield on said second frame.

72. In a typewriting machine, the combination of a carriage, a platen, a frame pivoted on the carriage and comprising a rock shaft and crank arms fixed thereto, a carriage stop loosely mounted on said rock shaft, ribbon spools on said carriage, turning devices for said spools comprising a pawl pivoted on one of said crank arms, a second frame pivoted on the first frame and comprising a rod, a pressure roll rotatable on said rod and contactive with said platen, and a type shield supported by said rod.

73. In a typewriting machine, the combination of a carriage, a platen, a frame stop, a coöperative stop on the carriage, paper controlling devices, ribbon mechanism on said carriage, and means for controlling said devices and said mechanism, said carriage stop being thrown into and out of line automatically with said frame stop by said means.

74. In a typewriting machine, the combination of a carriage, a two-part gravity frame thereon, a carriage stop on said frame, a coöperating frame stop, ribbon spools, automatic means operative during movements of the carriage to move said carriage stop into line with said frame stop, and manual means for moving said frame stop out of line and for automatically effecting a turning movement of one of said spools.

75. In a typewriting machine, the combination of a carriage, a manifold cut-out device, carriage carried ribbon mechanism, and means for concurrently controlling said cut-out device and said ribbon mechanism.

76. In a typewriting machine, the combination of a carriage, a manifold cut-out device supported thereon, ribbon feed mechanism, and means for controlling said cut-out device and for concurrently actuating said ribbon feed mechanism.

77. In a typewriting machine, the combination of a carriage, a manifold cut-out device supported thereon, ribbon spools carried by said carriage and provided with a ribbon, and means for moving said cut-out device in operative position and for concurrently turning one or the other of said spools.

78. In a typewriting machine, the combination of a carriage, a type shield, carriage carried ribbon feed mechanism, and manually operated means for concurrently moving said type shield into effective position and actuating said ribbon feeding mechanism.

79. In a typewriting machine, the combination of a carriage, a platen, a frame pivoted on the carriage and comprising a rock shaft and a crank arm, ribbon spools on said carriage, spool turning devices comprising a pawl pivoted on said crank arm, a second frame pivoted on the first frame and comprising a rod, and a pressure roll rotatable on said rod and contactive with the platen.

80. In a typewriting machine, the combination of a carriage, a platen, a frame pivoted on the carriage and comprising a rock shaft and a crank arm, ribbon spools on said carriage, spool turning devices comprising a pawl pivoted on said crank arm, a second frame pivoted on the first frame and comprising a rod, a pressure roll rotatable on said rod and contactive with the platen, and a type shield supported by said rod.

81. In a typewriting machine, the combination with a carriage and a main ribbon guide, of supplementary ribbon devices mounted on the carriage and comprising ribbon carriers at one end of the platen, a guide arranged near said ribbon carriers, and a second guide arranged inward from the first guide, the printing portion of the ribbon passing from one guide to the other over the printing line on the platen, one of said guides being movable to displace the printing portion of the ribbon and leave the printing line uncovered.

82. In a typewriting machine, the combination of a platen, a carriage, paper feeding devices comprising a paper apron partly surrounding the platen, and carriage carried ribbon devices including a ribbon guide supported on said paper apron.

83. In a typewriting machine, the combination of a platen, a carriage, paper feeding devices comprising a paper apron partly surrounding the platen, and carriage carried ribbon devices including a ribbon guide supported on said paper apron, said guide being movable to throw the printing portion of the carriage carried ribbon into and out of operative position.

84. In a typewriting machine, the combination of a carriage, a shaft thereon, ribbon spools on said shaft, a ratchet wheel on said shaft, a key operated frame pivoted on said carriage, and a pawl pivoted on said frame and coöperative with said ratchet wheel.

85. In a typewriting machine, the combination of a platen, a carriage, main and secondary ribbon devices, and two paper tables, the paper fed over one table being printed from the main ribbon and the paper fed over the other table being printed from the secondary ribbon.

86. In a typewriting machine, the combination of a platen, a carriage, main and secondary ribbon devices, two paper tables, the paper fed over one table being printed from the main ribbon and the paper fed over the other table being printed from the secondary ribbon, and a scale for positioning the paper last referred to.

Signed at the borough of Manhattan, city of New York, in the county of New York, and State of New York, this 7th day of April, A. D. 1915.

ARTHUR W. SMITH.

Witnesses:
E. M. WELLS,
CHARLES E. SMITH.